Patented Oct. 12, 1943

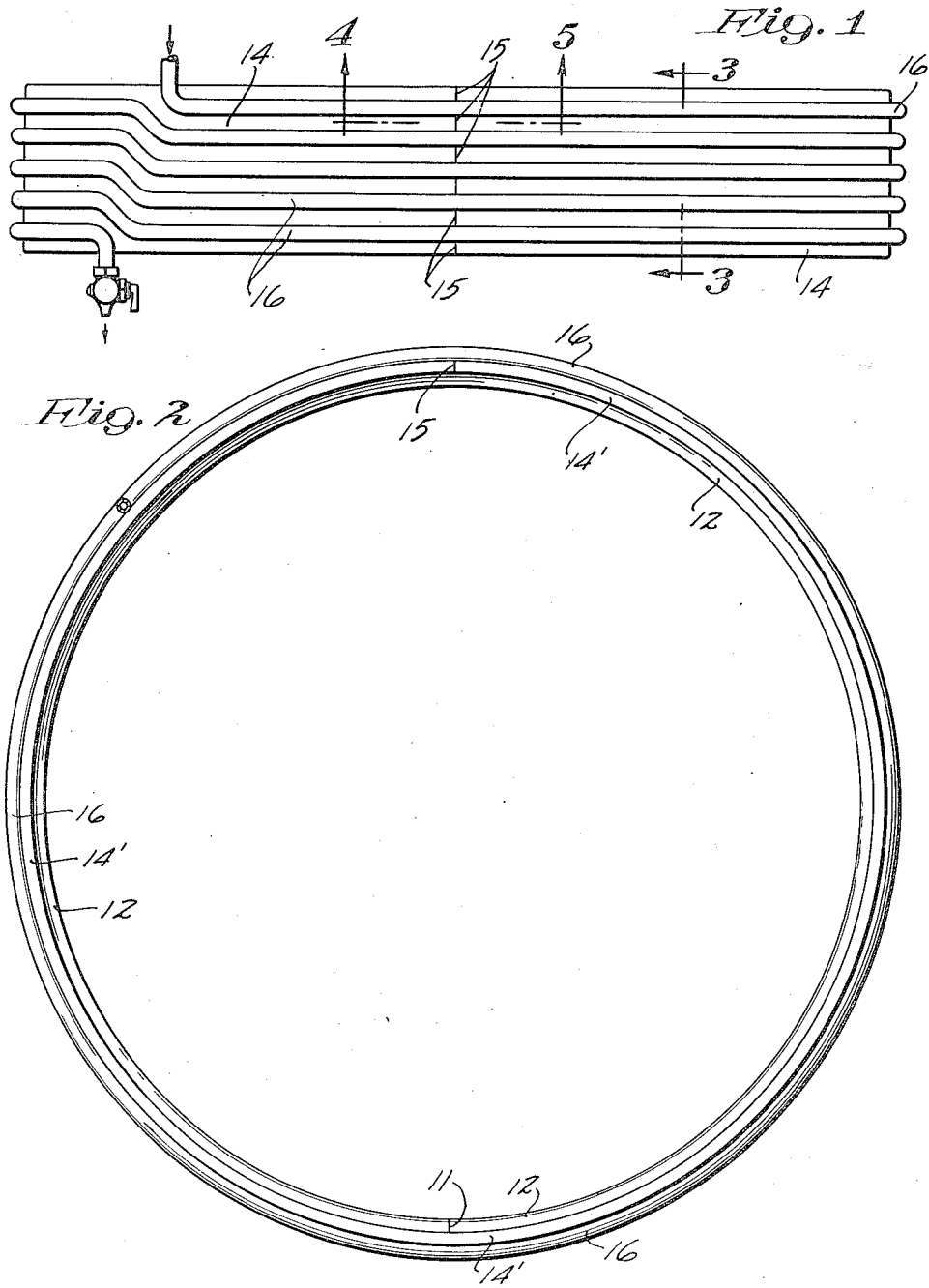

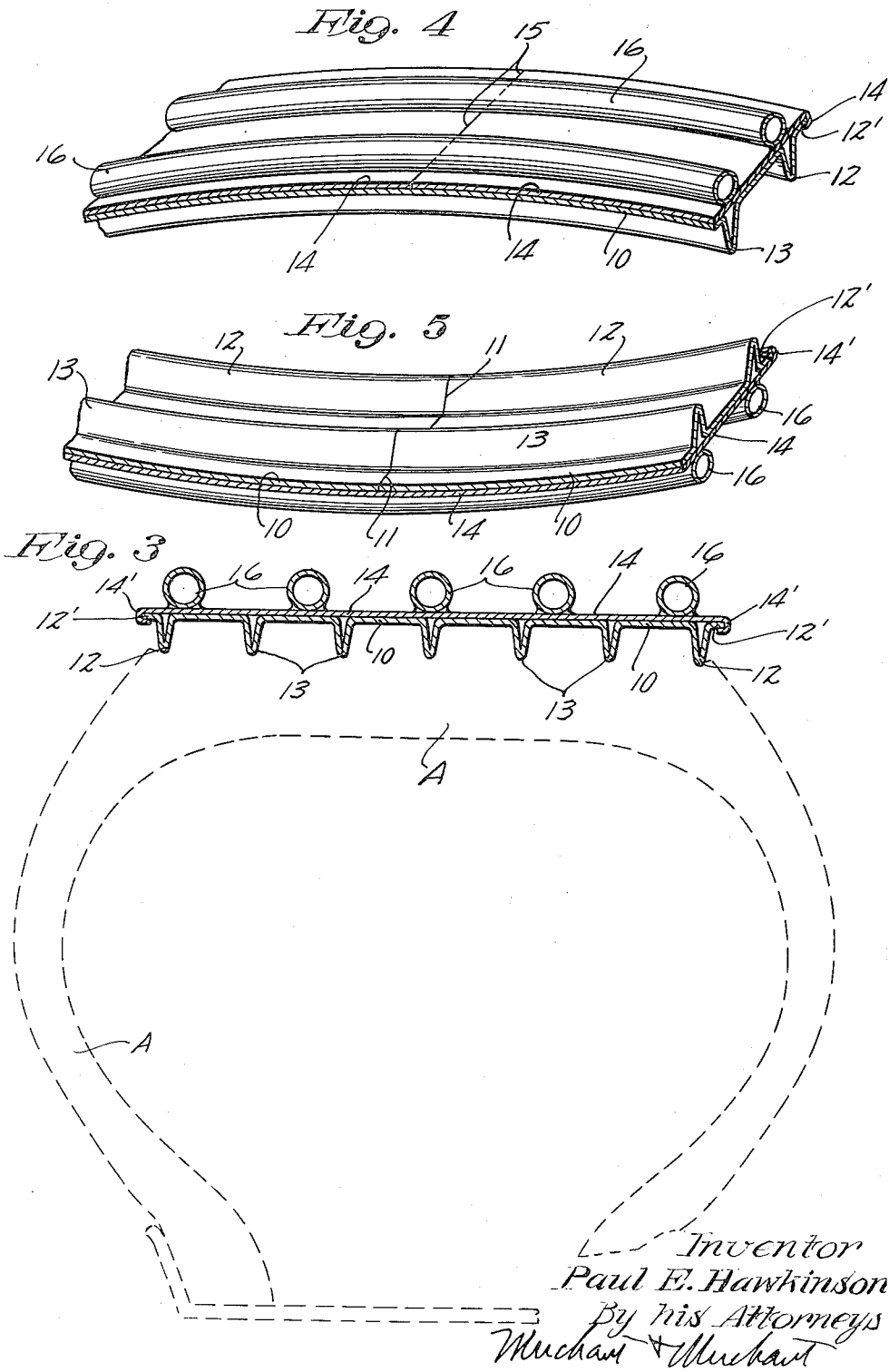

2,331,679

UNITED STATES PATENT OFFICE 2,331,679

PROCESS OF PRODUCING TIRE RETREAD-
ING MOLDS

Paul E. Hawkinson, Minneapolis, Minn., assignor
to Paul E. Hawkinson Company, Minneapolis,
Minn., a corporation of Minnesota Application July 14, 1941, Serial No. 402,262

2 Claims. (Cl. 29—148.2)

My present invention provides an improved mold for use in the retreading of pneumatic tires; and, generally stated, consists of the novel devices, combinations of devices and arrangement of parts hereinafter described and defined in the claims.

Particularly, this invention is an improvement on the so-called matrix or mold disclosed in my prior Patents No. 1,917,261 and 1,917,262. Such molds are extensively used in connection with the commercially well-known "Hawkinson system" of retreading pneumatic tires.

As hitherto generally constructed, the matrix has been made from sheet steel strips crimped cross-sectionally to form circumferentially extended sealing, and sometimes also tread design forming ribs; and the ends of the matrix forming sheet were then united by welding or brazing. Matrixes thus made would, under expanding pressure of a tire placed therein and inflated, tend to spread laterally and expand circumferentially and, moreover, the welded or brazed joints were frequently not as strong as the main body of the matrix.

My present application is directed to an improved process or method of producing the improved mold.

In the description of this improved device, the "mold" is described as made up of two important elements, to wit: the matrix or curing ring and a reinforcing band.

In accordance with my invention I first make the matrix or curing ring from a ribbon-like metal strip, by bending the same into cylindrical form and rigidly connecting the abutting ends thereof by welding. The mold is then completed by making a reinforcing band out of a ribbon-like sheet or strip of metal, preferably steel, which is then placed around the matrix and set with the joint at its abutting end circumferentially offset from the welded joint of the abutting ends of the matrix. The joint formed by the abutting ends of the reinforcing band should be set diametrically opposite the joint of the matrix.

A commercial form of the improved device is illustrated in the accompanying drawings wherein like characters indicate like parts throughout the several views.

Referring to the drawings:

Fig. 1 is a plan view of the complete retreading mold;

Fig. 2 is a side elevation of the mold shown in Fig. 1;

Fig. 3 is a transverse section taken on the line 3—3 of Fig. 1, showing the parts on a larger scale; and Figs. 4 and 5 are fragmentary sections on the same scale as Fig. 3 taken in section on the line 4—5 of Fig. 1 and showing, respectively, upper and lower portions of the mold.

In Fig. 3 the cross-section of a pneumatic tire casing is indicated by dotted lines by the character A. The matrix or curing ring, indicated by the numeral 10, is made of sheet metal, preferably sheet steel, and is bent into cylindrical form with its ends abutting at 11. This curing ring, at or near its edges, is crimped or corrugated to form endless sealing ribs 12 and also intermediate tread design forming ribs 13. The sealing ribs 12, in this preferred arrangement, have outturned flanges 12'.

Placed around and closely engaging the exterior of the curing ring 10 is a reinforcing band 14, preferably also of sheet steel, bent into cylindrical form and having its abutting ends united at 15. The extreme edges of the reinforcing band 14 are crimped or bent at 14' to embrace the edge flanges 12' of the matrix or sealing ring 10. The means for applying heat to the mold is applied around the exterior of the reinforcing band 14. The means for this purpose, illustrated in the drawings, is a coiled steam pipe 16 preferably welded to the exterior thereof.

The preferred method or manner of producing this mold is as follows: First, the matrix or curing ring 10 is produced and its abutting ends 11 are united by welding produced either electrically or by an acetylene torch, the latter operation being the one that I have employed in practice. This welding will frequently produce a roughness on the interior and exterior of the curing ring which should be ground off before the reinforcing band is applied.

As the next step the clamping band 14 will be produced of a diameter which will tightly fit around the curing ring or matrix. In the initial application of the clamping band around the curing ring, the flanges 14' may be turned inward at right angles with the cross-section thereof. Preferably, the clamping band is made of such length that when placed in close, but not the closest possible contact with the curing ring, there will be a space about $\frac{1}{16}$ of an inch between the abutting ends of said clamping band. Next, by tightly drawing a cable or chain around the clamping band, it is contracted into very tight and close engagement with the said curing ring and while under such compressing strain, the heat is applied to the joint 15 and as the molten metal is inserted between the abutting ends of said joint 15, there will be an expansion of the clamping band which will bring the abutting ends thereof into the closest kind of engagement; and then when the welded joint cools and solidifies, the clamping band will be contracted into very tight and close contact with the curing ring. After this has been done, the flanges 14' can be clinched or turned inward, as shown in Fig. 3, thereby uniting the curing ring and reinforcing band into the most intimate kind of connection and preventing the curing ring from being expanded, either radially or laterally, under pressure produced thereon in the curing of the retread.

As a last operation the heating means or coiled tube 16 will be applied around and welded or rigidly secured to the clamping band.

It is, of course, highly important that the welded joints 11—15 be spaced out of alignment circumferentially of the mold and, as already stated, the best arrangement is to place the said welded joints at diametrically opposite points in the mold.

In the preferred and above described arrangement of the mold, the clamping band, in transverse cross-section, is straight or, otherwise stated, the clamping band is of true cylindrical form so that the mold is adapted to apply to tire casings treads that are transversely flat.

What I claim is:

1. The process of producing a tire retreading mold of the kind described, which comprises forming of sheet metal a transversely split annular matrix and providing the same near its laterally spaced edges with inwardly projecting double-folded sealing ribs that are normally laterally resilient and further providing the same with laterally resilient double-folded pattern-forming ribs intermediate said sealing ribs, welding together the abutting ends of the annular sheet metal matrix, forming of sheet metal a transversely split annular clamping band and applying the same around said matrix with its laterally spaced edge portions projecting laterally beyond the edges of the matrix, circumferentially contracting said clamping band tightly against the exterior of the matrix, welding together the ends of said clamping band while thus contracted on the matrix, and bending the projecting edges of the clamping band against the edges of the matrix to thereby positively hold the matrix against lateral expansion and other movements within the clamping band.

2. The process of producing a tire retreading mold of the kind described, which comprises forming of sheet metal a transversely split annular matrix and providing the same near but slightly inwardly of its opposite edges with radially inwardly projecting double-folded sealing ribs which are normally laterally resilient and have cylindrical edge portions projecting laterally outwardly therefrom, welding together the abutting ends of the sheet metal matrix, forming of sheet metal a transversely split annular clamping band and applying the same around said matrix with its edge portions projecting laterally beyond the cylindrical edges of the matrix defined by the cylindrical projections of the sealing flanges, circumferentially contracting the clamping band tightly against the exterior of the matrix, welding together the ends of the clamping band while thus contracted on the matrix, and bending the projecting edges of the clamping band over and around the cylindrical edges of a matrix defined by the projecting edges of the sealing flanges to thereby positively hold the matrix against lateral expansion and other movements within said clamping band.

PAUL E. HAWKINSON.